2,741,800
Patented Apr. 17, 1956

United States Patent Office

2,741,800

RAPID CURING PROCESS FOR CAST POLYURETHANE RUBBERS

Charles E. Brockway, Akron, Ohio, assignor to The B. F. Goodrich Company, New York, N. Y., a corporation of New York No Drawing. Application September 11, 1952, Serial No. 309,150

10 Claims. (Cl. 18—58)

This invention relates to synthetic elastomeric polymers of the polyuretane class, and relates particularly to a process for obtaining rapid curing of cast polyurethane polymers of a rubbery nature by means of a water phase cure.

Casting fluids which give rubbery products when heated may be prepared by reacting with heat an excess of an organic diisocyanate with a polymeric diol. The molten reaction product, a polyurethane, may be poured into a mold and heated further to obtain a semi-cured elastomeric product. Even after many hours heating at temperatures from 120 to 150° C. these products are still soft, indicating a poor state of cure. Prolonged heating in a closed or open mold does not promote any further cure, and the soft under- or semi-cured stocks exhibit poor resilience, abnormally high stress relaxation and high permanent set. When these semi-cured stocks are allowed to age for several weeks in an open room, a further supplementary or after-cure takes place and the physical properties of the product are improved.

I have now found that the long aging period required for the supplementary or after-cure of semi-cured polyurethane polymers may be eliminated by means of a two-step curing process, and that quite unexpectedly the physical properties of the resulting product are greatly improved. The curing process of this invention involves first, heating the casting fluids in the absence of moisture in a mold for such a time as is necessary for the fluid to become solid enough to hold its shape and resist blowing on subsequent exposure to moisture; and second, completing the cure of the semi-cured stock by exposure to a heated fluid water phase such as steam or hot water for times sufficient to complete the cure. After such treatment, the cured polyurethane elastomers exhibit good resilience, low permanent set and excellent stress-strain properties.

The heated fluid water phase employed to effect the rapid cure is preferably boiling water or steam at about 100° C. The semi-cured polyurethane is preferably brought into contact with the water phase by immersion in the hot water or steam. Water heated to 50° C. will effect a cure of the semi-cured polyurethane but the rate of cure is much slower than that of boiling water, and water at room temperature, while effecting a cure, is even slower. Steam at temperatures as high as 150° C. may be employed to effect the cure but higher temperatures appear to exert a deleterious effect upon the surface of the product, probably causing some hydrolysis of the elastomer. The time of exposure will depend upon the temperature of the water phase used and the nature of the polyurethane. For polyesterurethanes containing a slight excess of organic diisocyanate, one hour's exposure in boiling water is adequate. Shorter periods of exposure may be employed if desired. These shorter periods of exposure may be employed at higher temperatures or with products containing a large excess of organic diisocyanate. As is well known in the art, physical properties of the product may be varied by controlling the state of cure and this technique may be employed with this invention.

The polyurethane casting fluids may be prepared by reacting a polyester with an organic diisocyanate to form a polyster urethane. An excess of an organic diisocyanate must be present to obtain a well-cured product. Glycol curing agents may be added to the polyesterurethane just prior to casting to obtain cured products with optimum physical properties. The polyesterurethane castings may also preferably contain organic plasticizers.

In the practice of the invention, a polymeric diol preferably a polyester such as anhydrous hydroxyl polyethylene adipate is reacted by heating with an excess of an organic diisocyanate such as a phenylene diisocyanate to form a fluid polyesterurethane; the fluid polyesterurethane, to which a glycol may be added as a curing agent if desired, is cast while still hot by pouring into a mold and heated, as for about one hour at about 150° C.; the solid casting is removed from the mold and immersed in a heated fluid water phase which is preferably boiling water or steam for about one hour and the cured product dried and cooled. The resulting cured elastomeric polyesterurethane is a well cured, snappy, resilient product having excellent stress-strain properties.

The polyesters are prepared by an esterification condensation reaction of an aliphatic dibasic (dicarboxylic) acid or an anhydride thereof with a glycol. Useful reactants are adipic acid and ethylene glycol. Polyesters with terminal carboxyl or hydroxyl groups may be prepared by reacting a molar excess of the appropriate acid or glycol. Those polyesters with terminal hydroxyl groups are the most useful for the purpose of this invention.

The dibasic acid and glycol are reacted together by heating, preferably at about 190° C. at atmospheric pressure for about 5 hours and while continuing to heat, the pressure is slowly reduced to about 1 mm. over a 10 to 15 hour period. During the initial heating period substantially all of the water of esterification and excess reactants are removed and this may be facilitated by bubbling nitrogen through the molten mass. Polyesters of average molecular weights of 600 to 2600 are obtained in this way. By continuing the evacuation and by heating the batch at higher temperatures, polyesters of molecular weights in the range of 5000 may be obtained. The polyester should be stored under anhydrous conditions if it is not utilized at once. If anhydrous polyester is not employed, bubbles may appear in the cured stock.

The polyester utilized includes polyesters prepared from the esterification of such dicarboxylic acids as malonic, succinic, glutaric, adipic, pimelic, sebacic, suberic, azelic, maleic and the like. It is not essential that the acid be used, the acid anhydride or acid chloride may be employed. Mixtures of acids may also be used.

The glycols utilized in the preparation of the polyester by reaction with the dicarboxylic acid may be ethylene glycol, 1,3-butanediol, 1,4-butanediol, pentamethylene glycol, hexamethylene glycol, diethylene glycol, triethylene glycol, 1,2-propane diol, 1,3-propanediol, 1,2-butanediol and the like. Mixtures of glycols may be employed.

The preferred organic diisocyanate for reaction with the polyester is a phenylene diisocyanate such as p-phenylene diisocyanate, m-phenylene diisocyanate or 4,4'-diisocyanate dibenzyl. Other organic diisocyanates which are useful include such aromatic diisocyanates as naphthylene-1,5-diisocyanate, diphenylmethane-p,p'-diisocyanate, triphenylmethane-p,p'-diisocyanate, meta-toluylene diisocyanate, aliphatic diisocyanates such as hexamethylene diisocyanate, mixtures thereof and the like. The molar quantities of diisocyanate employed with one mol of polyester in the practice of this invention may be from 1.01 to 2.0 mols, with about 1.05 to 1.6 mols preferred. When molar quantities above 1.6 are employed harder products are ordinarily obtained. The amount of diisocyanate employed is preferably greater than the molar sum of polyester and curing agent if any such agent is used. When the molar amount of polyester and curing agent is greater than the mols of diisocyanate used, there is obtained a soft stock of inferior physical properties. Equimolar ratios, or an excess of the polyester, may be employed if an excess of the organic diisocyanate is added prior to casting.

Polyfunctional hydroxyl curing agents may be employed to prepare cast polyesterurethane elastomers of superior physical properties. When a triol curing agent such as glycerol is employed, the cured casting ordinarily requires no further aging or after cure to obtain optimum physical properties, but when glycols such as ethylene glycol are employed, or only small amounts of the triol are used, then the means of this invention are particularly useful in rapidly obtaining optimum cures. The glycols are ordinarily added to the molten polyesterurethane just prior to casting, and an amount from about one-tenth to one mol per mol of polyester is ordinarily employed. Useful glycols include ethylene glycol, 1,3-butanediol, 1,4-butanediol, pentamethylene glycol, hexamethylene glycol, diethylene glycol, triethylene glycol, 1,3-propanediol, 1,2-butanediol, low-molecular weight polymeric diols such as hydroxyl polyethylene adipate and hydroxyl polypropylene sebacate with a molecular weight less than about 350, polyesters containing bound glycerol, mixtures of glycols and the like.

In the preparation of polyesterurethane castings, bubbles of gas often appear in the solid cured product. These bubbles may be eliminated by degassing the liquid reaction mixture under vacuum prior to casting. They may also be eliminated by adding an organic plasticizer to the reaction mixture. The use of such a plasticizer decreases the viscosity of the fluid and allows gas bubbles to escape more readily. Curing the cast material in a closed mold in a press often solves this difficulty.

The plasticizer used to aid in the elimination of gas bubbles may be any one that is compatible with the liquid polyurethane such as diphenyl octyl phosphate, tri-cresyl phosphate, methyl phthalate, benzyl phthalate, benzyl sebacate, tetrahydrofurfuryl adipate, acetyl tributyl citrate, butyl diglycol carbonate, tri-butyl phosphate, N,N, dibutyl benzene sulfonamide, phenyl napthyl ketone, phenyl ether, o-nitrobiphenyl, isoheptyl diphenylamine and the like. The most important requirement of the plasticizer is that it be compatible with the polyester, does not react with the diisocyanate and has a high enough boiling point so that it will not be lost during evacuation if such a step is included.

From 10 to 50 parts by weight of plasticizer to 100 parts by weight of polyester are preferred for this use. The plasticizer is preferably added to the polyester prior to reaction with the diisocyanate but may be added mixed with the diisocyanate.

The molds used for these castings are preferably heated prior to casting and are coated with a silicone grease or permanently with a polytetrafluoroethylene or other type material which do not adhere to the cast product.

The following examples are given to illustrate the practice of the invention and to more clearly demonstrate its embodiments.

*Examples 1 through 4*

A casting fluid is prepared by reacting together the following ingredients:

| Reactant | Mols | Mol Ratio | Grams |
|---|---|---|---|
| hydroxyl polyethylene adipate | 0.0446 | 1.00 | 50.00 |
| para phenylene diisocyanate | 0.0670 | 1.50 | 10.70 |
| ethylene glycol | 0.0179 | 0.40 | 1.11 |

The polyester (molecular weight 1120) is dried by swirling under a vacuum of 0.5 to 1.0 mm. at about 90 to 95° C. The diisocyanate is added to the molten polyester and the mixture stirred for about 3 minutes at 90 to 100° C. Dry ethylene glycol is then added to the fluid polyesterurethane and the mixture stirred for 2 minutes. The homogeneous mixture is evacuated briefly to remove any trapped air bubbles and poured into a standard tensile sheet mold. The cast polyesterurethane is cured at 150° C. Examples 1 and 2 are cured for one hour and Example 2 is then immersed in boiling water for 1 hour. Examples 3 and 4 are cured for 16 hours and then Example 4 is suspended in steam at 100° C. for one hour. Stress-strain results obtained on the resulting cured stocks are recorded in the data table below as ultimate tensile strength, elongation at break and modulus at 300% elongation.

| Example | Time of Cure at 150° C., hours | Subsequent Treatment | Stress-Strain | | |
|---|---|---|---|---|---|
| | | | Tensile Strength, p. s. i. | Elongation, percent | 300% Modulus, p. s. i. |
| 1 | 1 | None | 2,550 | 800 | 400 |
| 2 | 1 | boiling water 1 hr. | 6,000 | 730 | 540 |
| 3 | 16 | None | 2,870 | 760 | 490 |
| 4 | 16 | steam 1 hr. | 5,660 | 760 | 540 |

Extending the cure time from 1 hour to 16 hours results in no real improvement in physical properties or further curing, Examples 1 and 3. Exposure of either sample to boiling water or steam results in a rapid further cure and greatly improved physical properties including better resilience and lower permanent set.

*Example 5*

50 grams of a hydroxyl polyethylene adipate (mol ratio 1.00) is reacted with 7.61 grams of para phenylene diisocyanate (mol ratio 1.07) for about 3 minutes at 90 to 100° C. in the manner outlined for Examples 1 through 4, and the resulting polyesterurethane poured while fluid into a standard tensile mold. The product is cured for 16 hours at 150° C. The resulting stock is very soft and undercured, giving an elongation of 970% without breaking at a stress of only 425 p. s. i. A portion of the undercured stock is then suspended in steam at 100° C. for one hour and tested again. A tensile strength at break of 3950 p. s. i. and an elongation at break of 795% is obtained on this steam cured sample.

*Example 6*

A casting fluid is prepared by heating together for about three minutes at 90 to 100° C., 1.00 mol of a hydroxyl polyethylene adipate (1300 molecular weight) and 1.07 mols of para phenylene diisocyanate. The hot fluid is poured directly into a pellet mold and the polyesterurethane cured by heating the mold in an oven for 20 hours at 120° C. The solid rubbery pellets have a room temperature hardness value (shore Durometer "A") of 40–43 as the initial reading but this value rapidly drops off during the reading indicating a soft undercured stock. The pellets are then submerged for one hour in boiling water. The hardness values of these water treated pellets are 48–52 with no drop in the reading. The resilience of these pellets is greatly improved over that of untreated pellets.

*Examples 7 through 10*

Two different casting fluids prepared as outlined in Examples 1 through 4 from the following reactants are cast and cured for 90 minutes at 150° C. in the form of hysteresis blocks. A polyester containing bound glycerol is employed as a curing agent in these examples.

| Example | 7 | 9 |
|---|---|---|
| Hydroxyl polyethylene adipate (1370 molecular weight): | | |
| Grams | 159.5 | 159.5 |
| Mols | 0.1165 | 0.1165 |
| Hydroxyl polyethylene adipate containing 0.04 mols glycerol per mol of adipic acid (1200 molecular weight): | | |
| Grams | 62.4 | 62.4 |
| Mols | 0.0524 | 0.0524 |
| Para phenylene diisocyanate: | | |
| Grams | 28.0 | |
| Mols | 0.175 | |
| Meta Phenylene diisocyanate: | | |
| Grams | | 28.0 |
| Mols | | 0.175 |

Test pellets are cut from samples 7 and 9 and one-half of them tested in the Yerzeley Resilience Tester at 77° F., and the Goodrich Flexometer at 212° F. under a 55 pound load and an 0.25 inch stroke. The rest of the pellets (8) (10) are treated by immersing them in boiling water for 60 minutes and then tested. The following results are obtained:

| Example | Treatment After Cure | Yerzley Resilience, Percent | Goodrich Flexometer | | |
|---|---|---|---|---|---|
| | | | Hardness | Time, Minutes | ΔT, °F. |
| 7 | None | 78.1 | 49 | ᵃ 5.5 | 34 |
| 8 | 60" in boiling water | 88.9 | 51 | ᵇ 15.0 | 21 |
| 9 | None | 77.8 | 44 | ᵃ 3.5 | 22 |
| 10 | 60" in boiling water | 86.8 | 48 | ᵇ 15.0 | 24 |

ᵃ The pellets soften so much that they slip from between the anvils after this length of time. The temperature on these pellets is rising sharply at this point.
ᵇ Fifteen minutes is the usual test period, the temperature levels off by this time.

These examples illustrate further the advantages of employing the curing system of this invention.

When these experiments are repeated with other polyurethane polymers prepared from other polymeric diols such as other polyesters, polyethers and the like, other organic diisocyanates, with other glycol curing agents and/or plasticizers present, similar excellent results are obtained.

The cured rubbery castings obtained by means of this invention are particularly useful in mechanical goods applications.

Although I have described representative embodiments of the invention, I do not desire that it be limited solely thereto but only by the scope and spirit of the appended claims.

I claim:

1. The process for rapid curing of solid polyurethane castings which comprises heating a polyurethane casting fluid, which contains unreacted organic diisocyanate, in the absence of moisture in a mold for such a time as is necessary for the fluid to become solid enough to hold its shape and resist blowing on subsequent exposure to moisture; and then exposing the solid semi-cured stock to a heated fluid water phase at temperatures and times suitable to complete the cure.

2. The process of claim 1 wherein the temperature of the heated fluid water phase is 50° C. to 150° C.

3. The process of claim 1 wherein the heated fluid water phase is water from 50 to 100° C.

4. The process of claim 1 wherein the heated fluid water phase is steam from 100 to 150° C.

5. The process for rapid curing of solid polyurethane castings which comprises reacting by heating together a polymeric diol with an excess of an organic diisocyanate, pouring the fluid polyurethane into a mold and heating in the absence of moisture for about one hour at about 120–150° C. and then immersing the solid semi-cured polyurethane in a heated fluid water phase at about 100° C. for about one hour.

6. The process for rapid curing of solid polyurethane castings which comprises reacting by heating together a polymeric diol with an excess of an organic diisocyanate, adding a glycol, pouring the molten fluid into a mold and heating in the absence of moisture for about one hour at about 120° C.–150° C. and subsequently immersing the solid semi-cured casting in a heated fluid water phase at about 100° C. for about one hour.

7. The process for rapid curing of solid polyurethane castings which comprises reacting by heating together one mol of a polymeric diol which has a molecular weight of about 500 to 2500 with one to two mols of an organic diisocyanate, adding one-tenth to one mol of a glycol, pouring the molten fluid into a mold and heating in the absence of moisture for about one hour at about 120–150° C. and subsequently immersing the solid semi-cured casting in a heated fluid water phase at about 100° C. for about one hour to obtain a fully cured product.

8. The process of claim 7 wherein the polymeric diol is hydroxyl polyethylene adipate.

9. The process of claim 7 wherein the organic diisocyanate is a phenylene diisocyanate.

10. The process for rapid curing of solid polyurethane castings which comprises reacting by heating together one mol of a polymeric diol which has a molecular weight of about 500 to 2500 with one to two mols of an organic diisocyanate, an organic plasticizer, adding one-tenth to one mol of a glycol, pouring the molten fluid into a mold and heating in the absence of moisture for about one hour at about 120–150° C. and subsequently immersing the solid semi-cured casting in a heated fluid water phase at about 100° C. for about one hour to obtain a fully cured product.

References Cited in the file of this patent

UNITED STATES PATENTS

| | | |
|---|---|---|
| 2,576,749 | Carpentier | Nov. 27, 1951 |
| 2,621,166 | Schmidt et al. | Dec. 9, 1952 |
| 2,639,252 | Simon et al. | May 19, 1953 |
| 2,650,212 | Windemuth | Aug. 25, 1953 |